(12) United States Patent
Platner et al.

(10) Patent No.: US 7,341,317 B2
(45) Date of Patent: Mar. 11, 2008

(54) LOCALLY REINFORCED HOLLOW STRUCTURAL ASSEMBLY

(75) Inventors: David K. Platner, Shelby, MI (US);
Jim Trotter, Auburn Hills, MI (US);
Xinyu Wen, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 841 days.

(21) Appl. No.: 10/649,975

(22) Filed: Aug. 26, 2003

(65) Prior Publication Data

US 2004/0232688 A1 Nov. 25, 2004

Related U.S. Application Data

(60) Provisional application No. 60/430,477, filed on Dec. 2, 2002.

(51) Int. Cl.
*B60B 35/16* (2006.01)
(52) U.S. Cl. .................... 301/137; 301/124.1
(58) Field of Classification Search ............ 301/124.1, 301/137; 264/45.2, 46.6, 314; 52/309.9, 52/742.13
See application file for complete search history.

(56) References Cited

U.S. PATENT DOCUMENTS 4,200,326 A * 4/1980 Wilcox ..................... 295/23
4,269,890 A * 5/1981 Breitling et al. .............. 428/71
6,321,793 B1 * 11/2001 Czaplicki et al. ............ 138/93
6,348,513 B1 * 2/2002 Hilborn et al. ............... 521/95
6,516,913 B1 2/2003 Hartel et al.
7,169,344 B2 * 1/2007 Coon et al. ................ 264/263

FOREIGN PATENT DOCUMENTS

| EP | 1052123 A1 | 5/2000 |
| EP | 1106478 A2 | 10/2000 |
| GB | 1034999 A * | 7/1966 |
| GB | 2181998 A | 5/1987 |
| JP | 4-247149 | 9/1992 |

OTHER PUBLICATIONS http://findarticles.com/p/articles/mi_m3012/is_3_182/ai_84377734.*
Search Report EP03257542.

* cited by examiner

*Primary Examiner*—Jason R. Bellinger
*Assistant Examiner*—Kip Kotter
(74) *Attorney, Agent, or Firm*—Carlson, Gaskey & Olds

(57) ABSTRACT

A reinforced structural assembly is provided including a hollow structure having a cavity with a hole. A bag is inserted into the cavity using a tube. The bag has an end with an opening extending out of the cavity through the hole. A device injects a structural foam such as a two-part epoxy into the bag. The bag is closed and the end of the bag is inserted into the cavity. A cap is installed over the hole. The foam expands to fill the cavity but is contained within the bag thereby providing localized reinforcement in the desired area.

7 Claims, 1 Drawing Sheet

LOCALLY REINFORCED HOLLOW STRUCTURAL ASSEMBLY

The application claims priority to U.S. Provisional Application No. 60/430,477 which was filed on Dec. 2, 2002.

BACKGROUND OF THE INVENTION

This invention relates to reinforcement of a hollow structure, and more particularly, the invention relates to reinforcing a hollow structure with a material such as a structural foam.

Hollow structural members are used in a variety of vehicle applications. For example, portions of the vehicle body such as A- and B-pillars are formed from thin-walled hollow members. Also, suspension assemblies are incorporating increasingly thinner walls for tubular members such as axles. Utilizing thin walled structural members has the advantage of reducing the cost and weight of the assembly incorporating the structure.

In the case of axles, it is desirable to provide a wall thickness that maximizes bending and torsional stiffness while minimizing the weight. However, the thinner the wall thickness, the more susceptible the structure is to buckling under load. For example, auxiliary hardware such as spring brackets are typically clamped to the hollow axle structure. The wall may buckle under the clamping load or the leaf spring may walk during operation of the suspension assembly. To this end, prior art axle assemblies have added local stiffeners such as by welding on additional reinforcement plates to increase the stiffness.

For vehicle applications such as hollow body structures, such as A- and B-pillars, structural foams have been injected into the hollow cavity of the structure to provide localized reinforcement. The structural foam expands to fill the space and hardens to stiffen the area. However, walls must be formed in the hollow structure to contain the foam to the desired area since the structural foam is very costly. This is accomplished by stamping or welding steel walls into the structure to contain the foam. This raises complications in forming the hollow structural member which can add significant cost when formulating a design to accommodate the walls for containing the structural foam.

Therefore, what is needed is a method and apparatus for providing local reinforcement of a hollow structural member while reducing the cost and design complexity of prior art solutions.

SUMMARY OF THE INVENTION AND ADVANTAGES

The present invention provides a reinforced structural assembly including a hollow structure having a cavity with a hole. A bag is inserted into the cavity using a tube. The bag has an end with an opening extending out of the cavity through the hole. A device injects a structural foam such as a two-part epoxy into the bag. The bag is closed and the end of the bag is inserted into the cavity. A cap is installed over the hole. The foam expands to fill the cavity but is contained within the bag thereby providing localized reinforcement in the desired area. For axles, the cap may include a locating feature for positioning a component such as a leaf spring.

Accordingly, the present invention provides a method and apparatus for providing local reinforcement of a hollow structural member while reducing the cost and design complexity of prior art solutions.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1A:
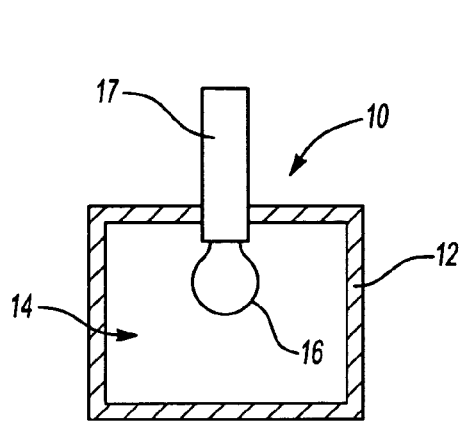
FIG. 1A depicts a bag being inserted into the cavity of a hollow structure.

Referring to FIGS. 1A-1F, a reinforced structural assembly of the present invention is shown at 10. The assembly 10 includes a hollow structure 12 defining a cavity 14 with a hole 15 in the wall of the structure 12 providing access to the cavity 14. A bag 16 is inserted into the cavity 14 through the hole 15 using a tube 17, shown in FIG. 1A. The bag 16 includes an end 18 having an opening 20 extending through the hole 15. For example, the bag 16 may be rolled up and inserted into a cardboard tube and then pushed into the cavity 14. The bag may be made of any suitable material, but is preferably a high temperature thermoplastic to withstand the exothermic reaction of the expanding foam. Such suitable materials may include a mylar, rubber, or polysulphone. Of course, any number of suitable materials may be used. The bag 16 contains the foam during expansion so that internal walls or baffles are not required in the hollow structure, which are difficult and expensive to design and manufacture.

Figure 1B:
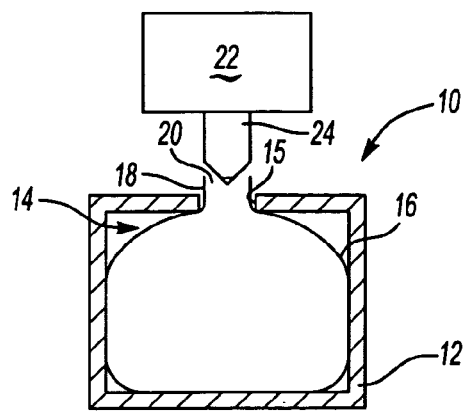
FIG. 1B depicts a bag being injected with structural foam.
Figure 1C:
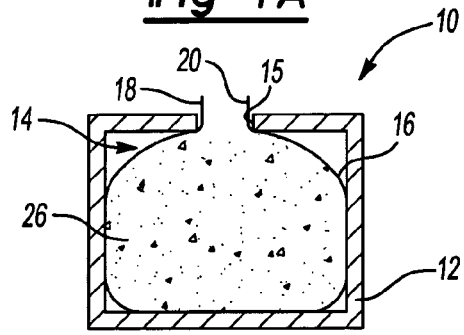
FIG. 1C depicts the bag filled with a structural foam.

A device 22 having a nozzle 24 injects a foam 26 into the bag 16 through the opening 20, as is best shown in FIGS. 1A and 1B. The device 22 may be manually or automatically operated. The structural foam filler material could be any suitable material having a high modulus. The foam 26 may be a composite material such as a glue, a filled acetal epoxy, a polyester, or any other suitable material. One such material is available by Henkel under the trade name TEROCORE 1015A and B. TEROCORE is a two component structural foam comprising a high strength expanding two-part epoxy with a 2:1 by volume mixed ratio. The TEROCORE epoxy expands approximately 30% and has a high modulus. TEROCORE is an exothermic material that cures an ambient temperature as the two components are mixed together and cures or hardens 90% within the first 30 minutes from the inside out. TEROCORE is fully cured within 24 hours and is a non-isocyanate material that does not require special ventilation during its use. The epoxy resin portion of TEROCORE has good stability and determines the curing speed. Fillers may be added to the material to improve the mechanical properties, provide sagging resistance, hardness, and determine the compression modules. The curing agent portion of TEROCORE determines the reactivity, adhesion, compression modulus, and shelf life of the material. The expanding agent of TEROCORE dictates the cell structure and reduces the overall weight of the structural foam.

Figure 1D:
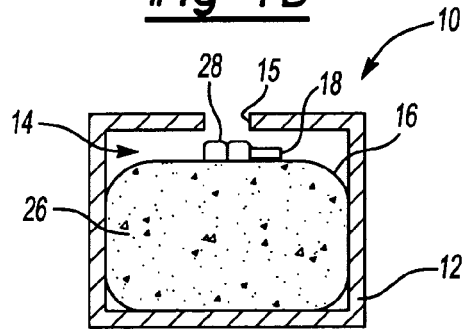
FIG. 1D depicts the bag closed with the end of the bag having an opening inserted into the cavity.
Figure 1E:
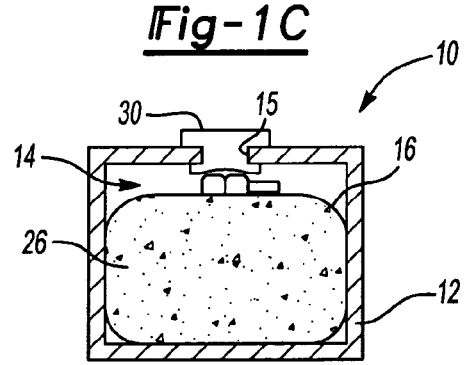
FIG. 1E depicts the hole of the structure closed with a cap.
Figure 1F:
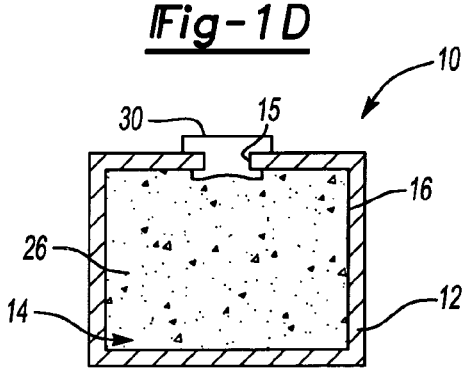
FIG. 1F depicts the structural foam fully expanded within the cavity.

Referring to FIG. 1D, once the structural foam 26 has been injected into the bag 16, the bag is closed. For example, the end 18 may be twisted, shown at 28, and inserted into the cavity 14. The hole 15 may be closed off by inserting a cap 30, as shown in FIG. 1E. The cap 30 further contains the structural foam 26 during expansion and provides an aesthetically pleasing appearance. The structural foam expands into engagement with the interior walls of the cavity 14 while remaining contained in the other directions by the bag 16, as best shown in FIG. 1F.

The present invention reinforced structural assembly 10 may be used in any thin walled hollow structural application in need of localized reinforcement. For example, the present invention may be used to locally reinforce hollow portions of the vehicle body such as A and B pillars. Specific areas of the body may be stiffened enabling thinner walls to be used elsewhere.

Figure 2:
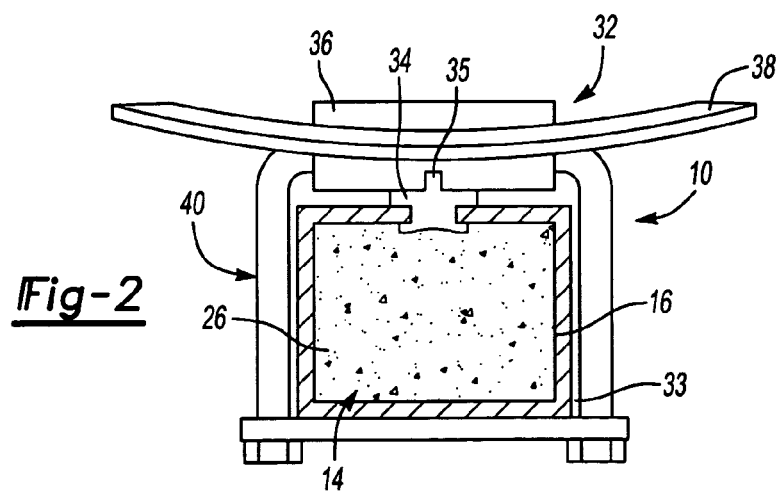
FIG. 2 depicts a suspension assembly with a hollow axle having localized reinforcement in the area of the suspension attachment.

The present invention is also suitable for use in suspension assemblies 32, as shown in FIG. 2. The suspension assembly 32 includes a hollow axle 33 for supporting suspension components such as a leaf spring 38. A portion of the axle 33 may be locally reinforced as described above relative to FIGS. 1A-1F to provide additional structural stiffness. The hole may be closed by a cap 34 having a locating feature 35 such as a protrusion extending therefrom. A bracket 36 supporting the leaf spring 38 may have a feature complimentary to that of the locating feature on the cap 34 to locate the suspension assembly 32 relative to the axle 33 during assembly. The bracket 36 is secured to the axle 33 by a U-bolt assembly 40, as is well known in the art. One of ordinary skill in the art will appreciate that components other than the leaf spring 38 described above may be secured to the hollow axle 33 or any other hollow member. For example, an air spring or any other component that typically exerts a large load on the axle 33 may be placed in the reinforced area. In the case of an axle, the hollow axle 33 is typically subject to buckling under the clamping load or walking of the suspension assembly 32 relative to the axle. With the locally reinforced hollow structure of the present invention, increased stiffness is provided thereby avoiding buckling or walking of the suspension assembly.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A reinforced structural member comprising:
a hollow axle defining a cavity;
a bag disposed within said cavity defining a space;
a material disposed within said bag filling said space; and
a suspension component secured to said hollow axle proximate to said material, said hollow axle including a hole with a cap having a locating feature disposed in said hole, said locating feature positioning said suspension component.

2. The reinforced structural member according to claim 1, wherein said bag includes a compressed size equal to or smaller than said hole to facilitate insertion of said bag into said cavity.

3. The reinforced structural member according to claim 2, wherein said cap is installed in said hole to enclose said cavity.

4. The reinforced structural member according to claim 2, wherein said bag includes an end having an opening facilitating insertion of said material into said bag.

5. The reinforced structural member according to claim 4, wherein said end is disposed within said cavity.

6. The reinforced structural member as according to claim 1, wherein said material is a structural foam.

7. The reinforced structural member according to claim 6, wherein said structural foam is a two-part epoxy.

* * * * *

UNITED STATES PATENT AND TRADEMARK OFFICE
CERTIFICATE OF CORRECTION

| | | |
|---|---|---|
| PATENT NO. | : 7,341,317 B2 | |
| APPLICATION NO. | : 10/649975 | |
| DATED | : March 11, 2008 | |
| INVENTOR(S) | : Platner et al. | |

It is certified that error appears in the above-identified patent and that said Letters Patent is hereby corrected as shown below:

Claim 6, Column 4, line 34: delete "as"

Signed and Sealed this

Twenty-fourth Day of June, 2008

JON W. DUDAS
*Director of the United States Patent and Trademark Office*